(12) United States Patent
Daher Adegas et al.

(10) Patent No.: US 9,976,539 B2
(45) Date of Patent: May 22, 2018

(54) CONTROL METHOD AND SYSTEM FOR WIND TURBINE

(71) Applicant: General Electric Company, Schenectady, NY (US)

(72) Inventors: Fabiano Daher Adegas, Garching b. Munchen (DE); Xiongzhe Huang, Shanghai (CN); Pranav Agarwal, Niskayuna, NY (US)

(73) Assignee: GENERAL ELECTRIC COMPANY, Shcenectady, NY (US)

( * ) Notice: Subject to any disclaimer, the term of this patent is extended or adjusted under 35 U.S.C. 154(b) by 308 days.

(21) Appl. No.: 14/732,862

(22) Filed: Jun. 8, 2015

(65) Prior Publication Data

US 2015/0361964 A1 Dec. 17, 2015

(30) Foreign Application Priority Data

Jun. 11, 2014 (CN) .......................... 2014 1 0258259

(51) Int. Cl.
*F03D 13/20* (2016.01)
*F03D 80/80* (2016.01)
(Continued)

(52) U.S. Cl.
CPC ........ *F03D 11/0091* (2013.01); *F03D 1/0675* (2013.01); *F03D 7/0224* (2013.01);
(Continued)

(58) Field of Classification Search
CPC ...... F03D 11/0091; F03D 13/20; F03D 17/00; F03D 80/82; F03D 1/0675; F03D 7/0224;
(Continued)

(56) References Cited

U.S. PATENT DOCUMENTS 4,193,005 A 3/1980 Kos et al.
7,944,067 B2 5/2011 Kammer et al.
(Continued)

FOREIGN PATENT DOCUMENTS

CA 2 871 278 A1 11/2013
CA 2871278 A1 11/2013
(Continued)

OTHER PUBLICATIONS

Stol et al.,"Individual Blade Pitch Control for the Controls Advanced Research Turbine (CART)", Journal of Solar Energy Engineering, ASME digital Colections, Jul. 26, 2006, vol. 128, Issue 4, 8 pages.
(Continued)

*Primary Examiner* — Logan Kraft
*Assistant Examiner* — Peter T Hrubiec
(74) *Attorney, Agent, or Firm* — Douglas D. Zhang; GE Global Patent Operation (57) ABSTRACT

A control method and a control system for a wind turbine are disclosed. The control method comprises measuring wind turbine blade pitch angles; obtaining a wind turbine rotor acceleration value; determining whether a blade pitch runaway fault condition is occurring; and during the blade pitch runaway fault condition, adjusting a pitch angle command based at least in part on the rotor acceleration value, a pitch angle of at least one faulted blade and a pitch angle of a healthy blade; and controlling wind turbine blades based at least in part on the adjusted pitch angle command.

18 Claims, 6 Drawing Sheets

(51) Int. Cl.
| | |
|---|---|
| *F03D 17/00* | (2016.01) |
| *F03D 1/06* | (2006.01) |
| *F03D 7/02* | (2006.01) |
| *F03D 7/04* | (2006.01) |
| *F03D 11/00* | (2006.01) |

(52) U.S. Cl.
CPC ............ *F03D 7/043* (2013.01); *F03D 13/20* (2016.05); *F03D 17/00* (2016.05); *F03D 80/82* (2016.05); *Y02E 10/721* (2013.01); *Y02E 10/723* (2013.01); *Y02E 10/728* (2013.01)

(58) Field of Classification Search
CPC .. F03D 7/043; F03D 7/024; F05B 2270/1011; F05B 2270/1014; F05B 2270/30; F05B 2270/304; F05B 2270/328; F05B 2270/327; Y02E 10/723
See application file for complete search history.

(56) References Cited

U.S. PATENT DOCUMENTS

| | | | |
|---|---|---|---|
| 7,948,100 B2 | 5/2011 | Nies et al. | |
| 8,217,524 B2 | 7/2012 | Nakashima et al. | |
| 8,240,990 B2 | 8/2012 | Kammer et al. | |
| 8,449,253 B2 | 5/2013 | Svendsen et al. | |
| 2002/0105189 A1 | 8/2002 | Mikhail et al. | |
| 2011/0142630 A1 | 6/2011 | Hayashi | |
| 2015/0176570 A1* | 6/2015 | Egedal | F03D 17/00 416/1 |

FOREIGN PATENT DOCUMENTS

| | | |
|---|---|---|
| CN | 101660493 A | 3/2010 |
| CN | 101918710 A | 12/2010 |
| CN | 102472245 A | 5/2012 |
| EP | 2535574 A1 | 12/2012 |
| WO | 2011023588 A2 | 3/2011 |

OTHER PUBLICATIONS

Muljadi E et al.,"Pitch-controlled variable-speed wind turbine generation", Industry Applications, IEEE Transactions, IEEEXplore, Jan./Feb. 2001, pp. 240-246, vol. 37, Issue: 1.

Hameeda et al.,"Condition monitoring and fault detection of wind turbines and related algorithms: A review", Renewable and Sustainable Energy Reviews, ScienceDirect, Jan. 2009, pp. 1-39, vol. 13, Issue 1.

First Office Action and Search issued in connection with corresponding CN Application No. 201410258259.6 dated Aug. 1, 2017.

\* cited by examiner

CONTROL METHOD AND SYSTEM FOR WIND TURBINE

BACKGROUND

This disclosure relates generally to wind turbines, and more particularly to a control method and a control system for a wind turbine.

Recently, wind turbines have received increased attention as an environmentally safe and relatively inexpensive alternative energy source. With this growing interest, considerable efforts have been made to develop wind turbines that are reliable and efficient.

A wind turbine includes a control unit, a rotor having a plurality of blades, and a blade pitch driver for adjusting the blade pitch to keep the speed of the wind turbine rotor within operating limits as the wind speed changes. The blades are usually feathered to reduce unwanted rotational torque in the event of wind gusts or emergency shutdowns.

However, when a blade pitch runaway fault occurs, the faulted blade cannot be controlled by the blade pitch driver and may move towards either fine position or feather position at a high pitch angle rate. Under this circumstance, the control unit will initiate a shutdown procedure that moves the blade pitch angles towards full-feathered position. During the shutdown, the wind turbine will experience an aerodynamic imbalance on the rotor due to the difference in pitch angles between the different blades, resulting in imbalance loads on a tower top and a hub of the wind turbine.

In conventional wind turbines, aggressive shutdown strategies may lead to high mechanical loads on some components (e.g. a yaw bearing, a pitch bearing, a tower, and a foundation). In particular, in the case where a blade runs away to power or feather, a fast shutdown of the other healthy blades results in high imbalance moments. The imbalance moments excite other components as well (e.g. the yaw bearing, the pitch bearing, the tower, the foundation, and a drive train).

Conventional open-loop shutdown control approaches with a fixed, pre-defined pitch-out profile require specific manual tuning and optimization of control parameters for each different wind turbine configuration. Additionally, because a single pitch out strategy needs to deal with any initial pitch angle and any varying wind condition during the shutdown, suboptimal performance with high variation of the peak loads may occur.

Therefore, it is desirable to provide a system and a method to address at least one of the above-mentioned problems.

BRIEF DESCRIPTION

In one aspect of embodiments of the present invention, a control method for a wind turbine is provided. The control method comprises measuring wind turbine blade pitch angles; obtaining a wind turbine rotor acceleration value; determining whether a blade pitch runaway fault condition is occurring; and during the blade pitch runaway fault condition, adjusting a pitch angle command based at least in part on the rotor acceleration value, a pitch angle of at least one faulted blade and a pitch angle of a healthy blade; and controlling wind turbine blades based at least in part on the adjusted pitch angle command.

In another aspect of embodiments of the present invention, a control system for a wind turbine is also provided. The control system comprises a wind turbine rotor having at least two blades and a pitch driver for driving the at least two blades and a control unit for determining when a blade pitch runaway fault occurs and, in response, adjusting a pitch angle command for the pitch driver based at least in part on a wind turbine rotor acceleration value, a pitch angle of at least one faulted blade, and a pitch angle of a healthy blade.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the present disclosure will be described hereinbelow with reference to the accompanying drawings. In the following description, well-known functions or constructions are not described in detail to avoid obscuring the disclosure in unnecessary detail.

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either or all of the listed items. The use of "including," "comprising" or "having" and variations thereof herein are meant to encompass the items listed thereafter and equivalents thereof as well as additional items.

Figure 1:
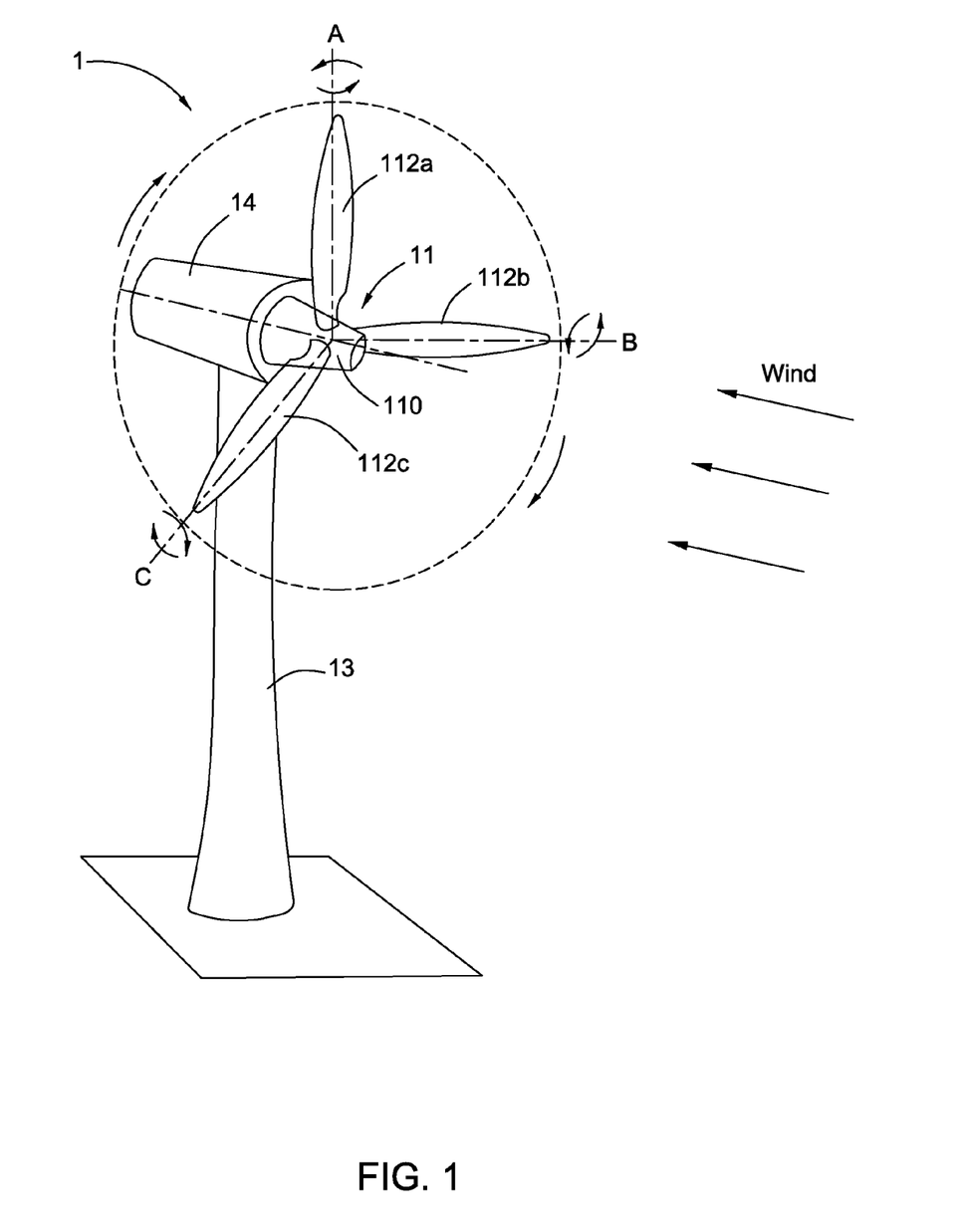
FIG. 1 is a schematic view of a wind turbine in accordance with one exemplary embodiment of the present invention.
Figure 2:
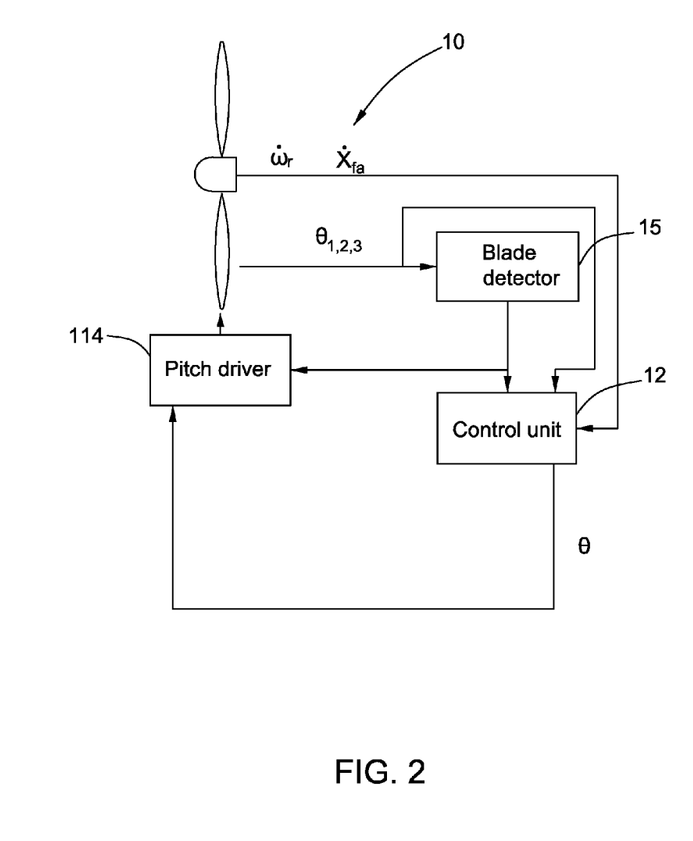
FIG. 2 is a schematic view of a control system in accordance with one exemplary embodiment of the present invention.
Figure 3:
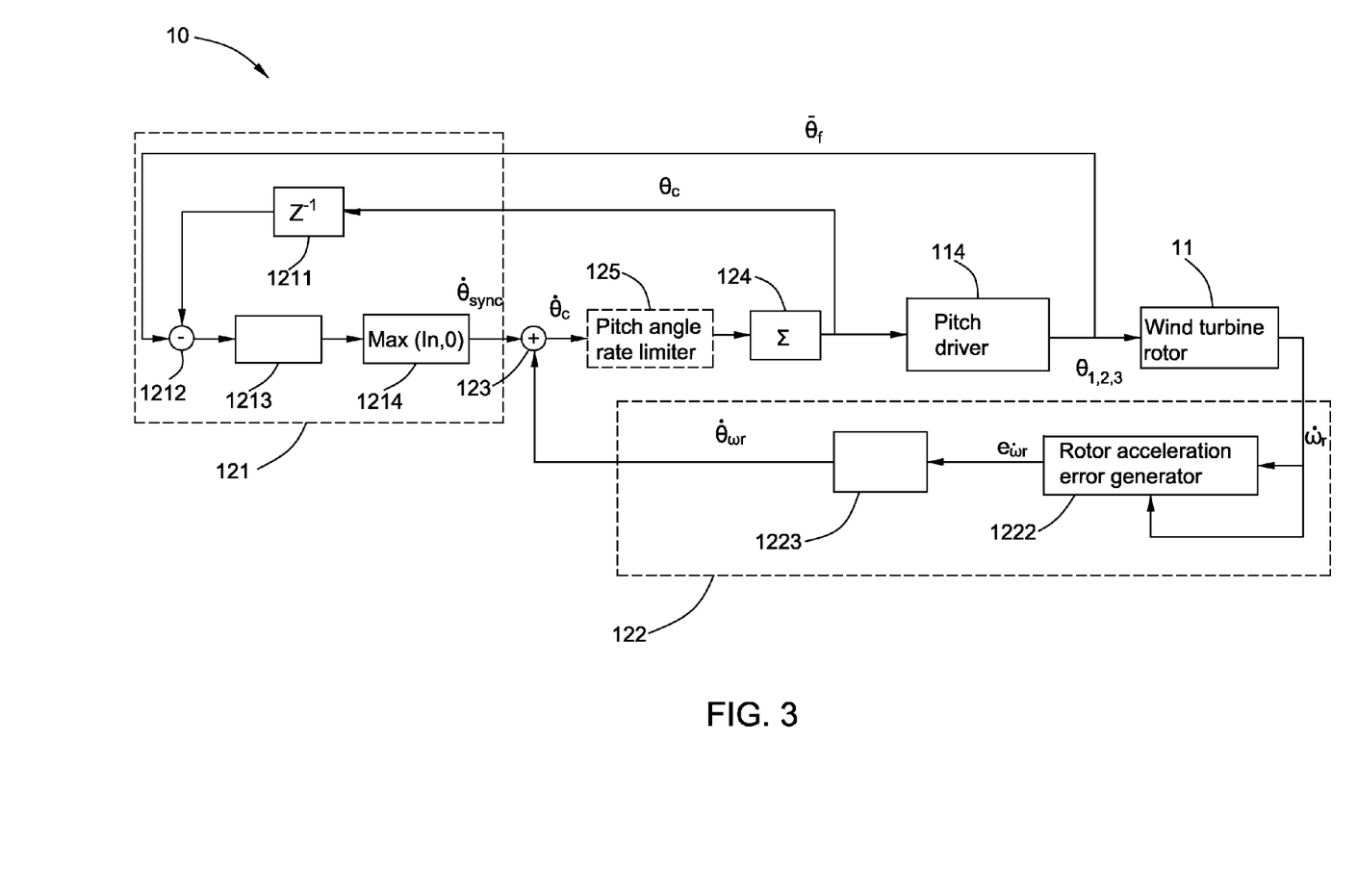
FIG. 3 is a block diagram of a control system in accordance with one exemplary embodiment of the present invention.

FIG. 1 illustrates a schematic view of an exemplary wind turbine in accordance with one embodiment of the present invention. In the example of FIG. 1, the wind turbine 1 includes a wind turbine rotor 11, a control unit 12 (as shown in FIG. 2), a tower 13 and a nacelle 14. The wind turbine rotor 11 includes a hub 110 connected to the nacelle 14, a pitch driver 114 (as shown in FIG. 2 and FIG. 3) installed in the hub 110 and at least two blades connected to the hub 110. In this embodiment, the wind turbine rotor 11 includes three blades 112a, 112b and 112c for purposes of example. However, the wind turbine rotor 11 of the invention is not limited to only include three blades 112a, 112b and 112c and may alternatively include two, four or more blades. The three blades 112a, 112b and 112c receive the wind and rotate together with the wind turbine rotor 11 which converts wind energy to mechanical energy through a mechanism such as a gear box (not shown) situated within the nacelle 14. The pitch driver 114 drives the three blades 112a, 112b and 112c so as to adjust the pitch of each blade 112a, 112b and 112c, here schematically illustrated by the curved arrows A, B and C, to keep a speed of the wind turbine rotor 11 within operating limits as the wind speed changes. More specifically, when a pitch angle of the blade (e.g., the blade 112a) is changed, which means the angle of the blade 112a exposed to the wind is changed and the rotational speed of the wind turbine rotor 11 can be changed accordingly.

FIG. 2 illustrates a schematic view of an exemplary control system for the wind turbine 1 in accordance with one embodiment of the present invention. With reference to FIG. 2, the control system 10 for the wind turbine 1 in accordance with one embodiment of the present invention may include a control unit 12, a blade detector 15, and a pitch driver 114. In one embodiment, the blade detector 15 is used for monitoring healthy/faulty status of the three blades 112a, 112b and 112c and providing the healthy/faulty status of the three blades 112a, 112b and 112c to the control unit 12. In one embodiment, the monitoring is based at least in part on a difference between one pitch angle of a blade and its respective pitch angle command for normal operation falling within or exceeding a pitch angle threshold. When a blade pitch runaway fault occurs, the control unit 12 will initiate a control procedure to shut down the wind turbine 1.

The corresponding control procedure of the control unit 12 to adjust a pitch angle command for the pitch driver 114 is based at least in part on a wind turbine rotor acceleration value $\dot{\omega}_r$, a pitch angle $\theta_f$ of at least one faulted blade and a pitch angle of a healthy blade. In one embodiment, the pitch angle of the healthy blade can be a pitch angle command for normal operation. Alternatively, in another embodiment, the pitch angle of the healthy blade can also be a pitch angle measurement of a healthy blade. In the descriptions below and the drawings, the pitch angle of the healthy blade is a pitch angle command $\theta_c$ for normal operation for purposes of example. The pitch driver 114 drives the three blades 112a, 112b and 112c based on the adjusted pitch angle command so as to shut down the wind turbine 1. If desired, functions of the blade detector 15 and/or the pitch driver 114 may also be integrated into the control unit 12.

FIG. 3 illustrates a block diagram of the control system 10 in accordance with one embodiment of the present invention. As shown in FIG. 3, the control unit 12 of the control system 10 may include a first control loop 121 and a second control loop 122.

Based at least in part on a difference between the pitch angle $\theta_f$ of the at least one faulted blade, for example, the blade 112a and the pitch angle of the healthy blade, for example, the pitch angle command for normal operation, $\theta_c$, the first control loop 121 generates a first pitch angle rate command $\dot{\theta}_{sync}$. The first control loop 121 comprises a unit delay operator 1211, a subtractor 1212, an angle-to-angular velocity converter 1213 and an amplitude limiter 1214. The pitch angle command for normal operation, $\theta_c$ is input to the unit delay operator 1211. In the unit delay operator 1211, based on the pitch angle command for normal operation, $\theta_c$, the commanded blade pitch angle at the current sample time $\theta_c[n]$ is computed by a sampled algorithms and the commanded blade pitch angle at the previous sample time $\theta_c[n-1]$ is further obtained, wherein n represents a sampling time. The unit delay operator 1211 is connected to the subtractor 1212, and the pitch angle $\theta_f$ of the at least one faulted blade 112a is also input to the subtractor 1212. In the subtractor 1212, a difference value which an output of the unit delay operator 1211, $\theta_c[n-1]$ minus the pitch angle $\theta_f[n]$ of the at least one faulted blade 112a, is obtained. The subtractor 1212 is connected to the angle-to-angular velocity converter 1213. In the angle-to-angular velocity converter 1213, an output of the subtractor 1212, $(\theta_c[n-1]-\theta_f[n])$ is converted into an angular velocity, $(\theta_c[n-1]-\theta_f[n])\div\Delta T$, wherein $\Delta T$ represents a sampling time interval. The angle-to-angular velocity converter 1213 is connected to the amplitude limiter 1214. In the amplitude limiter 1214, the greater of an output of the angle-to-angular velocity converter 1213 and zero, $\max\{(\theta_c[n-1]-\theta_f[n])\div\Delta T,0\}$ is selected. Therefore, the first pitch angle rate command $\dot{\theta}_{sync}$ may be obtained as follows:

$$\dot{\theta}_{sync}[n]=\max\{(\theta_c[n-1]-\theta_f[n])\div\Delta T,0\} \qquad (1)$$

It can be seen from the equation (1) that the first pitch angle rate command $\dot{\theta}_{sync}$ is limited to be larger than zero, which means that the blades 112a, 112b and 112c cannot be moved to power after a blade pitch angle runaway fault is detected. That is, the blades 112a, 112b and 112c can only stay at the same angle or move to feather.

The first pitch angle rate command $\dot{\theta}_{sync}$ of the first control loop 121 is obtained and used so that the pitch angles of other healthy blades 112b and 112c may be synchronized with the pitch angle of the at least one faulted blade 112a. An objective of the first control loop 121 is to minimize the pitch angle asymmetry between the other healthy blades 112b and 112c and the at least one faulted blade 112a and thereby reduce asymmetric rotor moments and related rotor imbalance and mechanical load.

In one embodiment, when at least two blades comprise faulted blades, the pitch angle of the at least one faulted blade $(\theta_f)$ that is sent to the first control loop 121 comprises an average pitch angle of the faulted blades $(\overline{\theta}_f)$.

Minimize of blade angle asymmetry without considering other wind turbine dynamics may result in over-speed of the rotor 11, particularly in blade runaways to power under turbulent wind conditions. The objective of the second control loop 122 is to control the rotational speed of the rotor 11 during the shutdown of the wind turbine 1.

Based at least in part on the rotor acceleration value $\dot{\omega}_r$, the second control loop 122 generates a second pitch angle rate command $\dot{\theta}_{\dot{\omega}_r}$. As shown in FIG. 2, the second control loop 122 comprises a rotor acceleration error generator 1222 as well as an arithmetic unit 1223. In an embodiment, the rotor acceleration error generator 1222 includes a saturation arithmetic with a rotor acceleration upper limit of $\dot{\omega}_{r,max}$ and no lower limit, that is, a negative infinity. However, the saturation arithmetic is only an example of what the rotor acceleration error generator 1222 can include. Certainly, the rotor acceleration error generator 1222 is not limited hereinto. The rotor acceleration error generator 1222 can also take other forms, such as including a pre-stored minimum deceleration curve, a saturation with hysteresis and etc. The rotor acceleration value $\dot{\omega}_r$ is input to the rotor acceleration error generator 1222. In the rotor acceleration error generator 1222, an error value $e_{\dot{\omega}_r}$ between the rotor acceleration value $\dot{\omega}_r$ and a rotor acceleration reference $\dot{\omega}_{r,ref}$ selected from an interval from the rotor acceleration upper limit $\dot{\omega}_{r,max}$ to the negative infinity is obtained, and then is input to the arithmetic unit 1223.

$$\dot{\omega}_{r,ref}=[\dot{\omega}_{r,max},-\infty) \qquad (2)$$

$$e_{\dot{\omega}_r}=\dot{\omega}_{r,ref}-\dot{\omega}_r \qquad (3)$$

In the arithmetic unit 1223, the second pitch angle rate command $\dot{\theta}_{\dot{\omega}_r}$ is obtained by the following arithmetic operation, $$\dot{\theta}_{\omega_r} = \left(\frac{\partial M z_{aero}}{\partial \theta_1} + \ldots + \frac{\partial M z_{aero}}{\partial \theta_m}\right)^{-1} \left(-\frac{\partial M z_{aero}}{\partial \omega_r} \dot{\omega}_r + K_1(\dot{\omega}_{r,ref} - \dot{\omega}_r)\right) \quad (4)$$

Wherein $$\frac{\partial M z_{aero}}{\partial \theta_m}$$

represents a partial derivative of rotational moment on the blade pitch angle, m represents a number of the blades, $\omega_r$ represents the angular velocity of the rotor 11, $$\frac{\partial M z_{aero}}{\partial \omega_r}$$

represents a partial derivative of rotational moment on the angular velocity of the rotor 11, $K_1$ represents a real scalar gain.

In this embodiment, the wind turbine rotor 11 includes three blades 112a, 112b and 112c. The number of the blades, m is three, so the equation (4) can be simplified as follows, $$\dot{\theta}_{\omega_r} = \quad (5)$$
$$\left(\frac{\partial M z_{aero}}{\partial \theta_1} + \frac{\partial M z_{aero}}{\partial \theta_2} + \frac{\partial M z_{aero}}{\partial \theta_3}\right)^{-1} \left(-\frac{\partial M z_{aero}}{\partial \omega_r} \dot{\omega}_r + K_1(\dot{\omega}_{r,ref} - \dot{\omega}_r)\right)$$

The partial derivatives of rotational moment composing the second control loop 122, usually derived from an aerodynamic model of the rotor is updated at runtime to adjust the second pitch angle rate command $\dot{\theta}_{\omega_r}$ according to variations of the dynamics of the wind turbine 1 in its current operating state.

In the embodiment of FIG. 3, the control unit 12 further includes a summator 123. An output of the first control loop 121, that is, the first pitch angle rate command $\dot{\theta}_{sync}$ and an output of the second control loop 122, that is, the second pitch angle rate command $\dot{\theta}_{\omega_r}$ are respectively input to the summator 123 such that a summed pitch angle rate command $\dot{\theta}_c$ satisfies the following equation, $$\dot{\theta}_c = \dot{\theta}_{sync} + \dot{\theta}_{\omega_r} \quad (6)$$

Because the pitch driver 114 usually receives a pitch angle command as an input signal but not a pitch angle rate command, the summed pitch angle rate command $\dot{\theta}_c$ need to be input to an integral operator 124. In the integral operator 124, the summed pitch angle rate command $\dot{\theta}_c$ is integrated so that the summed pitch angle rate command $\dot{\theta}_c$ is transformed into an adjusted pitch angle command.

Optionally, the control unit 12 may further include a pitch angle rate limiter 125 between the summator 123 and the integral operator 124. When a tower velocity in a fore-aft direction of the tower 13 of the wind turbine 1 is greater than a tower velocity threshold, the pitch angle rate limiter 125 may be used to limit a maximum of the summed pitch angle rate command $\dot{\theta}_c$. The pitch angle rate limiter 125 can increase damping of tower oscillations so that tower loads are not increased significantly. To obtain the tower velocity in the fore-aft direction, in one embodiment, the control system 10 further includes an accelerometer (not shown) installed in the nacelle 14 of the wind turbine 1 for measuring a tower acceleration in the fore-aft direction, $\dot{X}_{fa}$ of the tower 13. In this embodiment, the tower velocity in the fore-aft direction is estimated based on the tower acceleration in the fore-aft direction, $\dot{X}_{fa}$.

Figure 4:
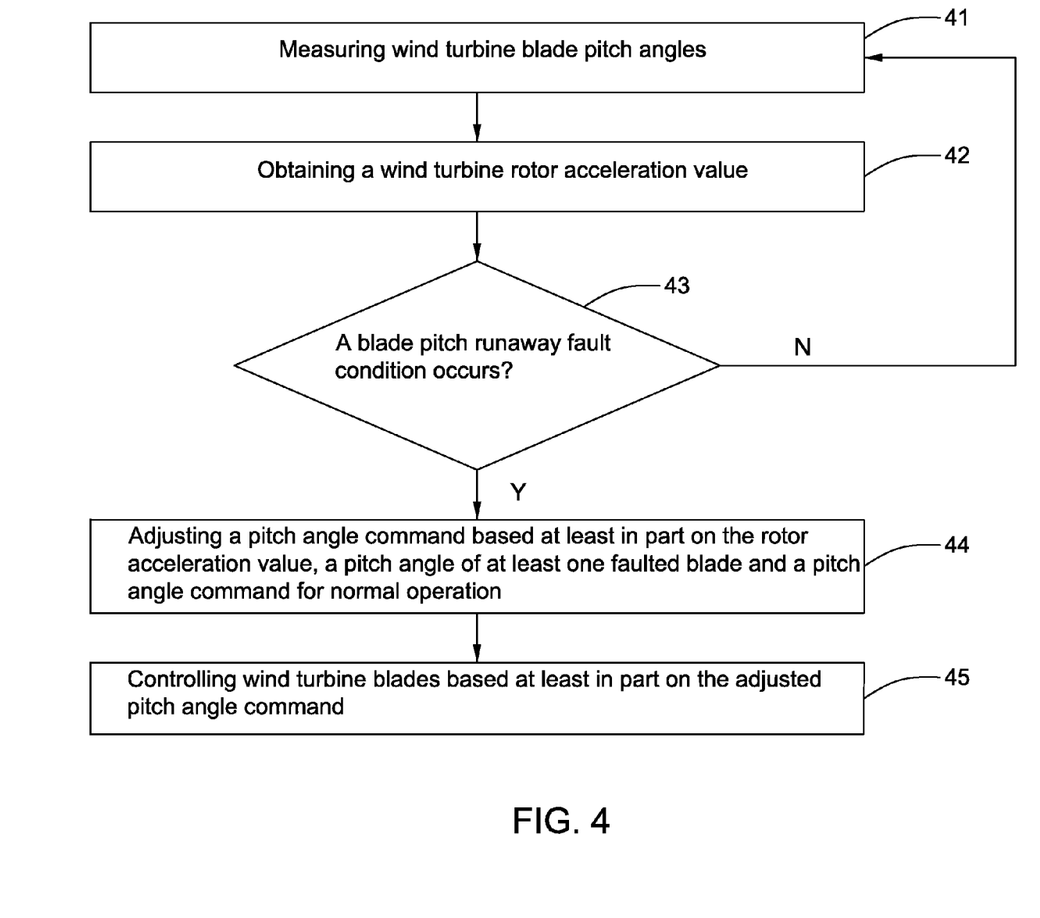
FIG. 4 is a flowchart of a control method in accordance with one exemplary embodiment of the present invention.

FIG. 4 is a flowchart of a control method in accordance with one exemplary embodiment of the present invention that includes the following steps.

At block 41, wind turbine blade pitch angles are measured. For example, in this embodiment, pitch angles $\theta_1$, $\theta_2$ and $\theta_3$ of the three blades 112a, 112b and 112c are respectively measured.

At block 42, a wind turbine rotor acceleration value $\dot{\omega}_r$ is obtained. In one embodiment, obtaining the wind turbine rotor acceleration value $\dot{\omega}_r$ further includes measuring a wind turbine rotor angular velocity $\omega_r$ and estimating the wind turbine rotor acceleration value $\dot{\omega}_r$ based on the wind turbine rotor angular velocity $\omega_r$.

At block 43, it is determined whether a blade pitch runaway fault condition is occurring. In one embodiment, determining whether the blade pitch runaway fault condition is occurring comprises determining whether a difference between any blade pitch angle and its respective pitch angle command for normal operation falls within or exceeds a pitch angle threshold. If the determined result is NO, the process returns to step 41. If the determined result is YES (that is, at least one blade, such as for example the blade 112a, is experiencing a blade pitch runaway fault), the step goes to block 44.

At block 44, during the blade pitch runaway fault condition, a pitch angle command is adjusted based at least in part on the rotor acceleration value $\dot{\omega}_r$, a pitch angle of at least one faulted blade, $\theta_f$ and a pitch angle of a healthy blade, for example a pitch angle command for normal operation, $\theta_c$.

At block 45, the wind turbine blades 112a, 112b and 112c are controlled based at least in part on the adjusted pitch angle command.

Figure 5:
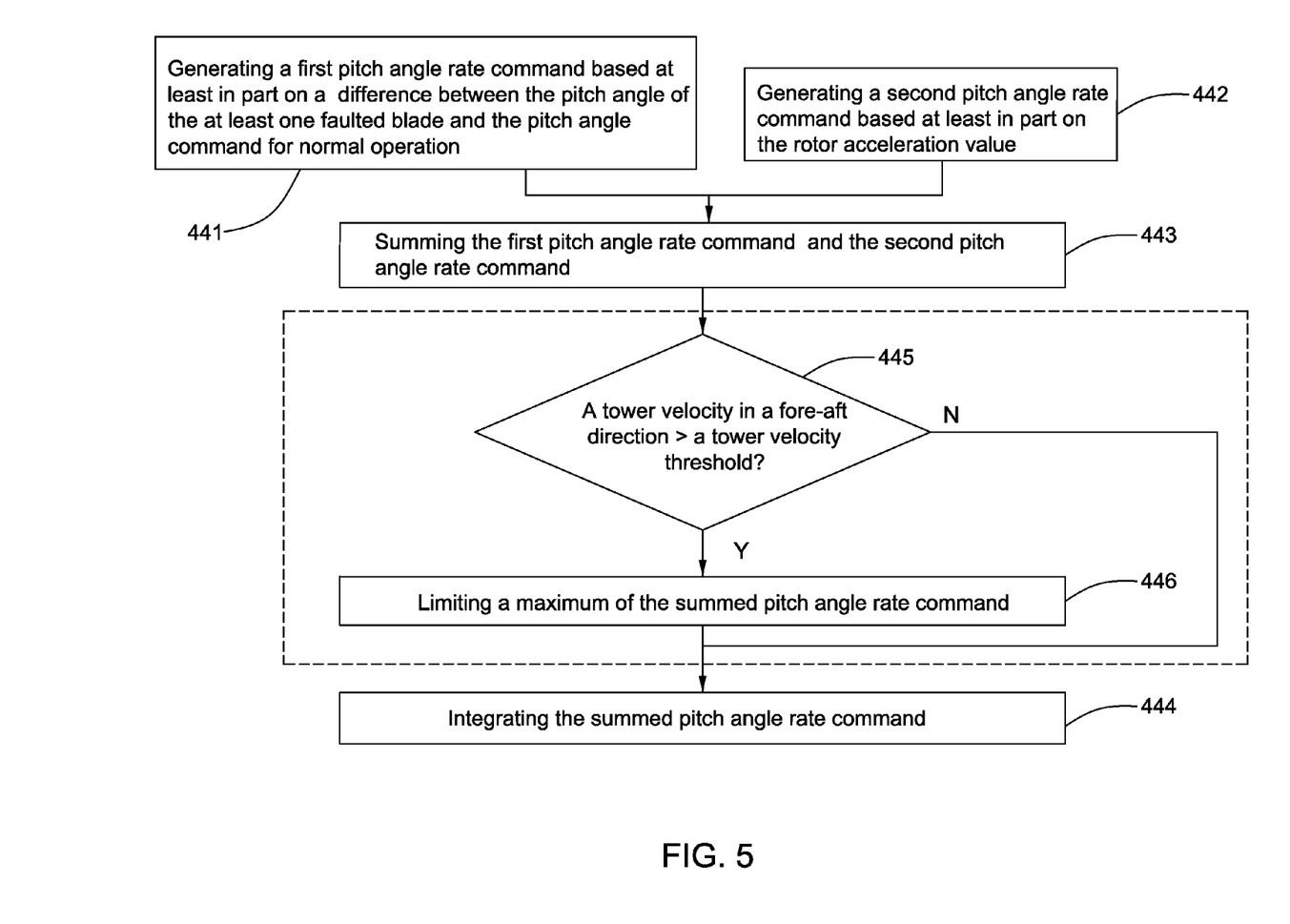
FIG. 5 is a detailed flowchart of an adjusting step in the control method of FIG. 4.

FIG. 5 is a flowchart of an embodiment for the adjusting step in the control method of FIG. 4.

At block 441, a first pitch angle rate command $\dot{\theta}_{sync}$ is generated based at least in part on a difference between the pitch angle of the at least one faulted blade, $\theta_f$ and the pitch angle command for normal operation, $\theta_c$. In one embodiment, the first pitch angle rate command $\dot{\theta}_{sync}$ is calculated by the equation (1). The equation (1) has been described in detail in the control system 10 before, so its detailed descriptions are omitted here. When at least two blades comprise faulted blades, the pitch angle of the at least one faulted blade, $\theta_f$ comprises an average pitch angle of the faulted blades, $\bar{\theta}_f$.

At block 442, a second pitch angle rate command $\dot{\theta}_{\omega_r}$ is generated based at least in part on the rotor acceleration value $\dot{\omega}_r$. In one embodiment, the rotor acceleration error generator 1222 includes a saturation arithmetic with a rotor acceleration upper limit of $\dot{\omega}_{r,max}$ and no lower limit, that is, a negative infinity. The second pitch angle rate command $\dot{\theta}_{\omega_r}$ is generated based on the rotor acceleration value $\dot{\omega}_r$ in conjunction with the saturation arithmetic with the rotor acceleration upper limit of $\dot{\omega}_{r,max}$ and the negative infinity. In detail, the second pitch angle rate command $\dot{\theta}_{\omega_r}$ is calculated by the equations (2) and (4). The equations (2) and (4) have been described in detail in the control system 10 before, so their detailed descriptions are omitted here.

At block 443, the first pitch angle rate command $\dot{\theta}_{sync}$ and the second pitch angle rate command $\dot{\theta}_{\omega_r}$ are summed so as to obtain a summed pitch angle rate command $\dot{\theta}_c$.

At block 444, the summed pitch angle rate command $\dot{\theta}_c$ is integrated so that the summed pitch angle rate command $\dot{\theta}_c$ is transformed into a pitch angle command which can be received by the pitch driver 114.

After the above steps 441-444 occur, an adjusted pitch angle command is finally obtained.

In one embodiment, before the step 444 of integrating the summed pitch angle rate command $\dot{\theta}_c$, the following steps are included.

At block 445, it is determined whether a tower velocity in a fore-aft direction of the tower 13 of the wind turbine 1 is greater than a tower velocity threshold. If the determined result is NO, the process moves to block 444. If the determined result is YES, the step goes to block 446.

At block 446, a maximum of the summed pitch angle rate command $\dot{\theta}_c$ is limited when the tower velocity in the fore-aft direction of the tower 13 of the wind turbine 1 is greater than the tower velocity threshold. Then, the step goes to block 444.

Figure 6:
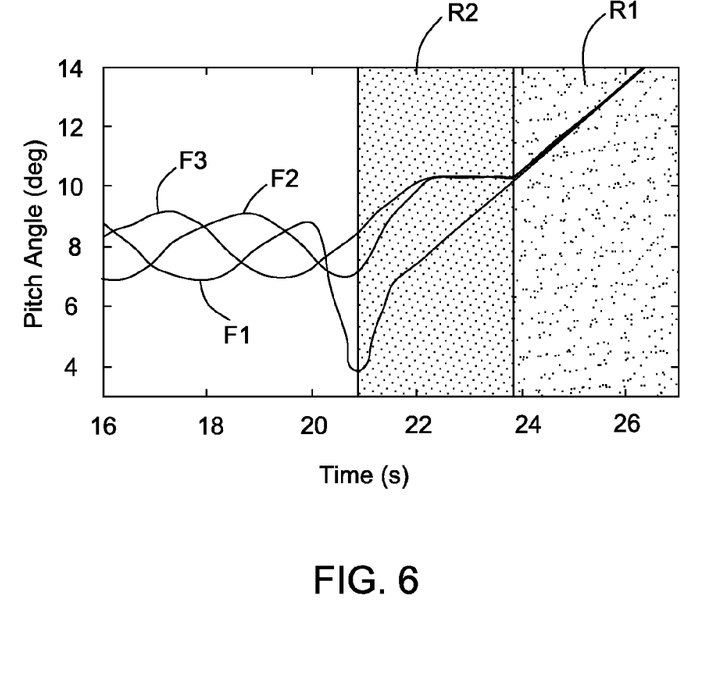
FIG. 6 illustrates time series of blade pitch angles in the event of single blade runaway to power in accordance with one exemplary embodiment of the present invention.
Figure 7:
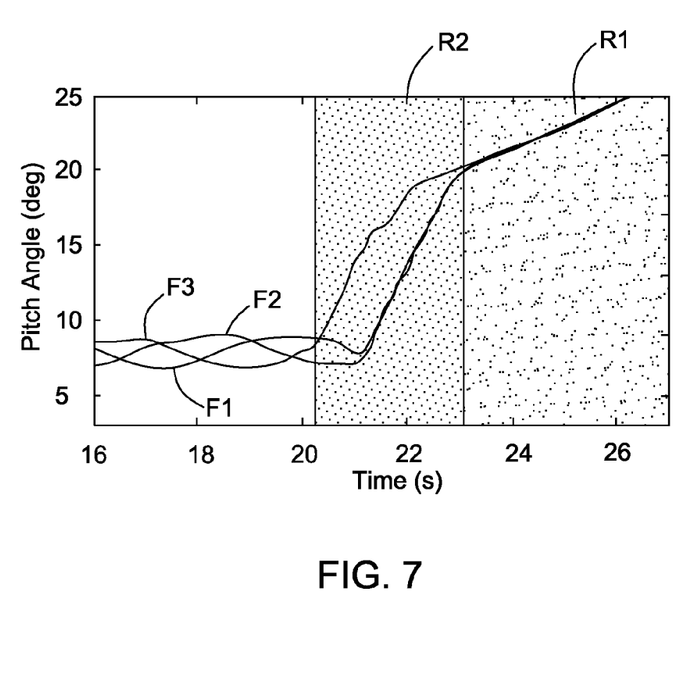
FIG. 7 illustrates time series of blade pitch angles in the event of single blade runaway to feather in accordance with one exemplary embodiment of the present invention.

FIG. 6 illustrates time series of blade pitch angles resulting from the control method in accordance with one exemplary embodiment in the event of single blade runaway to power, and FIG. 7 illustrates time series of blade pitch angles resulting from the control method in accordance with one exemplary embodiment in the event of single blade runaway to feather. Referring to FIG. 6 and FIG. 7, three curves F1, F2 and F3 respectively represent pitch angle profiles of the three blades 112a, 112b and 112c, wherein the curve F1 represents the pitch angle profile of the faulted blade 112a, and the curves F2 and F3 respectively represent the pitch angle profiles of the healthy blades 112b and 112c. An area R2 can show a predominance of the second control loop 122 which increases the blade pitch angles. An area R1 can show a predominance of the first control loop 121 which minimizes the asymmetry of the blade pitch angles.

The control system 10 or the control method in accordance with embodiments of the present invention can determine the adjusted pitch angle command for the blades 112a, 112b and 112c when the blade pitch runaway fault occurs so that the pitch angle asymmetry between the healthy blades (e.g. the blades 112b and 112c) and the faulted blade (e.g. 112a) is reduced, and the deceleration of the rotor 11 is controlled. As the pitch angle asymmetry is minimized in a timely manner, extreme loads resulting from the blade pitch runaway fault can be mitigated. Hence, both load mitigation and the deceleration of the rotor 11 can be achieved during the shutdown of the wind turbine 1. Application of the control system 10 or the control method does not require additional sensor measurement and instead may use sensors that are typically already available on the wind turbine. In addition, the component costs can be substantially reduced.

While the disclosure has been illustrated and described in typical embodiments, it is not intended to be limited to the details shown, since various modifications and substitutions can be made without departing in any way from the spirit of the present disclosure. As such, further modifications and equivalents of the disclosure herein disclosed may occur to persons skilled in the art using no more than routine experimentation, and all such modifications and equivalents are believed to be within the spirit and scope of the disclosure as defined by the following claims.

What is claimed is:

1. A control method comprising:
   measuring wind turbine blade pitch angles;
   obtaining a wind turbine rotor acceleration value;
   determining whether a blade pitch runaway fault condition is occurring; and
   during the blade pitch runaway fault condition,
   adjusting a pitch angle command based at least in part on the wind turbine rotor acceleration value, a pitch angle of at least one faulted blade and a pitch angle of a healthy blade, wherein adjusting the pitch angle command comprises:
   generating a first pitch angle rate command based at least in part on a difference between the pitch angle of the at least one faulted blade and the pitch angle of the healthy blade;
   generating a second pitch angle rate command based at least in part on the wind turbine rotor acceleration value;
   summing the first pitch angle rate command and the second pitch angle rate command; and
   integrating the summed pitch angle rate command; and
   controlling wind turbine blades based at least in part on the adjusted pitch angle command.

2. The control method of claim 1, wherein the pitch angle of the healthy blade comprises a pitch angle command for normal operation or a pitch angle measurement of the healthy blade.

3. The control method of claim 1, wherein the first pitch angle rate command is calculated by the following equation, $$\dot{\theta}_{sync}[n] = \max\{(\theta_c[n-1] - \theta_f[n]) + \Delta T, 0\}$$

wherein:
$\dot{\theta}_{sync}$ represents the first pitch angle rate command,
$\theta_c$ represents the pitch angle of the healthy blade,
$\theta_f$ represents the pitch angle of the at least one faulted blade,
n represents a sampling time, and
$\Delta T$ represents a sampling time interval.

4. The control method of claim 3, wherein when at least two blades comprise faulted blades, the pitch angle of the at least one faulted blade comprises an average pitch angle of the faulted blades.

5. The control method of claim 1, further comprising:
   generating the second pitch angle rate command based on the wind turbine rotor acceleration value in conjunction with a saturation arithmetic with a rotor acceleration upper limit and no lower limit.

6. The control method of claim 5, wherein the second pitch angle rate command is calculated by the following equation, $$\dot{\theta}_{\dot{\omega}_r} = \left(\frac{\partial Mz_{aero}}{\partial \theta_1} + \ldots + \frac{\partial Mz_{aero}}{\partial \theta_m}\right)^{-1}\left(-\frac{\partial Mz_{aero}}{\partial \omega_r}\dot{\omega}_r + K_1(\dot{\omega}_{r,ref} - \dot{\omega}_r)\right)$$

$$\dot{\omega}_{r,ref} = [\dot{\omega}_{r,max}, -\infty)$$

wherein:
$\dot{\theta}_{\dot{\omega}_r}$ represents the second pitch angle rate command, $$\frac{\partial Mz_{aero}}{\partial \theta_m}$$

represents a partial derivative of rotational moment on the blade pitch angle,
m represents a number of the blades,
$\omega_r$ represents an angular velocity of the rotor, $$\frac{\partial Mz_{aero}}{\partial \omega_r}$$

represents a partial derivative of rotational moment on the angular velocity of the rotor, $\dot{\omega}_r$ represents the wind turbine rotor acceleration value, $K_1$ represents a real scalar gain, $\dot{\omega}_{r,max}$ represents the rotor acceleration upper limit, and $\dot{\omega}_{r,ref}$ represents a rotor acceleration reference selected from an interval from the rotor acceleration upper limit to a negative infinity.

7. The control method of claim 1, wherein adjusting the pitch angle command further comprises:
limiting a maximum of the summed pitch angle rate command when a tower velocity in a fore-aft direction of a tower of a wind turbine is greater than a tower velocity threshold.

8. The control method of claim 1, wherein obtaining the wind turbine rotor acceleration value comprises:
measuring a wind turbine rotor angular velocity; and
estimating the wind turbine rotor acceleration value based on the wind turbine rotor angular velocity.

9. The control method of claim 1, wherein determining whether the blade pitch runaway fault condition is occurring comprises determining whether a difference between any blade pitch angle and its respective pitch angle command for normal operation exceeds a pitch angle threshold.

10. A control system comprising:
a wind turbine rotor comprising:
at least two blades; and
a pitch driver for driving the at least two blades; and
a control unit for determining when a blade pitch runaway fault occurs and, in response, adjusting a pitch angle command for the pitch driver based at least in part on a wind turbine rotor acceleration value, a pitch angle of at least one faulted blade, and a pitch angle of a healthy blade, wherein the control unit comprises:
a first control loop for generating a first pitch angle rate command based at least in part on a difference between the pitch angle of the at least one faulted blade and the pitch angle of the healthy blade;
a second control loop for generating a second pitch angle rate command based at least in part on the wind turbine rotor acceleration value;
a summator for summing the first pitch angle rate command and the second pitch angle rate command; and
an integral operator for integrating the summed pitch angle rate command.

11. The control system of claim 10, wherein the pitch angle of the healthy blade comprises a pitch angle command for normal operation or a pitch angle measurement of the healthy blade.

12. The control system of claim 10, wherein the first control loop comprises:
a unit delay operator for obtaining $\theta_c[n-1]$ based on the pitch angle of the healthy blade, $\theta_c$, wherein n represents a sampling time;
a subtractor for subtracting the pitch angle of the at least one faulted blade, $\theta_f[n]$, from an output of the unit delay operator, $\theta_c[n-1]$;
an angle-to-angular velocity converter connecting with the subtractor for converting an output of the subtractor, $(\theta_c[n-1]-\theta_f[n])$, into an angular velocity, $(\theta_c[n-1]-\theta_f[n])\div\Delta T$, wherein $\Delta T$ represents a sampling time interval; and
an amplitude limiter connecting with the angle-to-angular velocity converter for selecting a greater between an output of the angle-to-angular velocity converter and zero, $\max\{(\theta_c[n-1]-\theta_f[n])\div\Delta T, 0\}$.

13. The control system of claim 12, wherein when at least two blades comprise faulted blades, the pitch angle of the at least one faulted blade comprises an average pitch angle of the faulted blades.

14. The control system of claim 10, wherein the second control loop comprises:
a rotor acceleration error generator including a saturation arithmetic with a rotor acceleration upper limit of and no lower limit for generating an error value between the wind turbine rotor acceleration value and a rotor acceleration reference selected from an interval from the rotor acceleration upper limit to a negative infinity; and
an arithmetic unit for generating the second pitch angle rate command by the following arithmetic operation, $$\dot{\theta}_{\dot{\omega}_r} = \left(\frac{\partial Mz_{aero}}{\partial \theta_1} + \ldots + \frac{\partial Mz_{aero}}{\partial \theta_m}\right)^{-1}\left(-\frac{\partial Mz_{aero}}{\partial \omega_r}\dot{\omega}_r + K_1(\dot{\omega}_{r,ref} - \dot{\omega}_r)\right)$$

$$\dot{\omega}_{r,ref} = [\dot{\omega}_{r,max}, -\infty)$$

wherein:

$\dot{\theta}_{\dot{\omega}_r}$ represents the second pitch angle rate command, $$\frac{\partial Mz_{aero}}{\partial \theta_m}$$

represents a partial derivative of rotational moment on the blade pitch angle, m represents a number of the blades, $\omega_r$ represents an angular velocity of the rotor, $$\frac{\partial Mz_{aero}}{\partial \omega_r}$$

represents a partial derivative of rotational moment on the angular velocity of the rotor, $\dot{\omega}_r$ represents the wind turbine rotor acceleration value, $K_1$ represents a real scalar gain, $\dot{\omega}_{r,max}$ represents the rotor acceleration upper limit, and $\dot{\omega}_{r,ref}$ represents the rotor acceleration reference selected from the interval from the rotor acceleration upper limit to the negative infinity.

15. The control system of claim 10, further comprising a pitch angle rate limiter for limiting a maximum of the summed pitch angle rate command when a tower velocity in a fore-aft direction of a tower of a wind turbine is greater than a tower velocity threshold.

16. The control system of claim 15, further comprising an accelerometer for measuring a tower acceleration in the fore-aft direction of the tower for use in estimating the tower velocity in the fore-aft direction.

17. The control system of claim 16, wherein the accelerometer is installed in a nacelle of the wind turbine.

18. The control system of claim 10, wherein the control unit determines when the blade pitch runaway fault occurs based at least in part on a difference between any blade pitch angle and its respective pitch angle command for normal operation exceeding a pitch angle threshold.

* * * * *